United States Patent
Sladek et al.

(10) Patent No.: US 7,479,751 B2
(45) Date of Patent: Jan. 20, 2009

(54) ELIMINATION OF UNINTENDED VELOCITY REVERSALS IN S-CURVE VELOCITY PROFILES

(75) Inventors: Bohumir Sladek, Prague (CZ); Jacob Strickler Baker, Rocky River, OH (US)

(73) Assignee: Rockwell Automation Technologies, Inc., Mayfield Heights, OH (US)

( * ) Notice: Subject to any disclaimer, the term of this patent is extended or adjusted under 35 U.S.C. 154(b) by 172 days.

(21) Appl. No.: 11/668,111

(22) Filed: Jan. 29, 2007

(65) Prior Publication Data

US 2008/0180045 A1     Jul. 31, 2008

(51) Int. Cl.
*G05B 19/416* (2006.01)
*G05B 11/01* (2006.01)

(52) U.S. Cl. .................. 318/568.18; 318/560; 318/567; 318/568.11

(58) Field of Classification Search ................. 318/560, 318/567, 568.11, 568.18, 568.23, 270, 276–278
See application file for complete search history.

(56) References Cited

U.S. PATENT DOCUMENTS

| | | | |
|---|---|---|---|
| 4,761,595 A | | 8/1988 | Goor |
| 4,769,583 A | | 9/1988 | Goor |
| 5,057,756 A | * | 10/1991 | Hara .......................... 318/569 |
| 5,144,211 A | * | 9/1992 | Daggett et al. ......... 318/568.11 |
| 5,151,639 A | * | 9/1992 | Hasegawa et al. ...... 318/568.18 |
| 5,331,264 A | * | 7/1994 | Cheng et al. ........... 318/568.11 |
| 6,552,507 B2 | * | 4/2003 | Miyazawa ............. 318/568.11 |
| 6,865,425 B2 | | 3/2005 | McNutt |
| 6,873,490 B2 | * | 3/2005 | Guo et al. ................ 360/78.07 |
| 7,158,900 B2 | | 1/2007 | McNutt |
| 7,280,899 B2 | * | 10/2007 | Cheng ......................... 701/29 |
| 2003/0191593 A1 | | 10/2003 | McNutt |
| 2003/0220702 A1 | | 11/2003 | McNutt |
| 2005/0267701 A1 | | 12/2005 | McNutt |
| 2005/0273287 A1 | | 12/2005 | McNutt |
| 2005/0278130 A1 | | 12/2005 | McNutt |
| 2007/0075670 A1 | * | 4/2007 | Akiyama .................... 318/651 |

\* cited by examiner

*Primary Examiner*—Bentsu Ro
*Assistant Examiner*—Thai Dinh
(74) *Attorney, Agent, or Firm*—Fay Sharpe LLP; R. Scott Speroff (57) ABSTRACT

A method is employed to eliminate undesired velocity reversal in a motion profile. A start speed, a start acceleration, a speed limit, an acceleration limit, a deceleration limit, an acceleration jerk limit, and a deceleration jerk limit are programmed for the motion profile. A critical jerk value needed to avoid velocity reversal associated with the motion profile is calculated. The critical jerk value is compared to the programmed deceleration jerk limit. The larger of the critical jerk value and the programmed deceleration jerk limit is set as a computed maximum deceleration jerk limit for use with the motion profile. In this manner, the computed maximum deceleration jerk limit will never be lower than the critical jerk and undesired velocity reversal is eliminated.

20 Claims, 6 Drawing Sheets

ELIMINATION OF UNINTENDED VELOCITY REVERSALS IN S-CURVE VELOCITY PROFILES

BACKGROUND

The present exemplary embodiment relates to motion control systems. In one embodiment, velocity, acceleration and jerk of a motion control system can be modified. It finds particular application with controlling the jerk parameters of a system in order to eliminate unwanted velocity reversal. However, it is to be appreciated that the present exemplary embodiment is also amenable to other like applications.

Motion control systems are employed to control motion within a system. A motion control system is generally comprised of a motion controller, a drive, a motor, one or more mechanical elements and a position feedback device. Application software can be employed to command target positions and motion control profiles. The motion controller can act as the intelligence of a system by taking the desired target positions and motion profiles and creating the trajectories for the motors to follow. The drive takes commands from the controller and generates the current required to drive or turn the motor. The motor turns electrical energy into mechanical energy and produces the torque required to move to a desired target position. Motors are designed to provide torque to some mechanics such as linear slides, robotic arms or actuators. The position feedback device is not required for some motion control applications (e.g., stepper motors), but can be employed with others (e.g., servo motors). The feedback device, usually a quadrature encoder, senses the motor position and reports the result to the controller, thereby closing the loop to the motion controller.

The motion controller calculates each commanded move trajectory and further utilizes such calculated trajectories to determine the proper torque command to send the motor drive and actually cause motion. The motion trajectory describes the motion controller board control or command signal output to the driver, resulting in a motor/motion action that follows the profile. The typical motion controller calculates the motion profile trajectory segments based on the parameter values you program. The motion controller uses the desired target position, maximum target velocity, and acceleration values provided to the system to determine how much time it spends in three primary move segments (acceleration, constant velocity and deceleration).

In order to achieve smooth high-speed motion without overtaxing the motor, the controller must direct the motor driver to operate judiciously to achieve optimum results. This is accomplished using shaped velocity profiles to limit the acceleration and deceleration profiles required. Two disparate profiles are commonly employed, a trapezoidal profile and an s-curve profile. A trapezoidal profile changes velocity in a linear fashion until the target velocity is reached. A trapezoidal profile typically results in a shorter duration of motion. When decelerating, the velocity decreases in a linear manner until it reaches a zero velocity. Graphing velocity versus time results in a trapezoidal plot. Advances in technology allow user modification of the acceleration/deceleration with more sophisticated controllers to provide individual settings for various motion parameters. In this manner, trapezoidal motion profiles are employed to obtain higher speeds without skipping steps or stalling.

Although a trapezoidal velocity profile is adequate for most applications, such a profile may cause some system disturbances located at "corners" of the trapezoidal profile. These disturbances can be realized as small vibrations that extend the settling time. For demanding applications sensitive to this phenomenon, the profile can be modified to have an S-shape during the acceleration and deceleration periods. This can minimize the vibrations realized by a device controlled by a motion control system. The S-curve profile can take more time to complete, but a jerk response at the beginning, ending, and transition points are removed. Jerk can be found at the transition points wherein there is acceleration to maximum velocity and maximum velocity to deceleration.

S-curve acceleration and deceleration refers to the shape of the velocity profile of a given move. Without using s-curve acceleration when you load an acceleration, velocity and position, the motor tries to go from zero to the specified acceleration instantaneously. When a motor does this, it creates a trapezoidal velocity profile. When the motor is ready to stop, it once again goes from a zero acceleration to a negative acceleration as fast as it can until it is at a zero velocity and then abruptly stops. These abrupt starts and stops create the sharp corners of a trapezoidal profile. The sharp corners translate to a very high jerk. Jerk is the derivative of acceleration and refers to abrupt changes in acceleration.

The smooth control for a change in the velocity command uses acceleration and deceleration control. Arithmetically, acceleration is the second derivative of position or the first derivative of velocity. A motor is employed to facilitate motion of a load from one location to another. As the motor is at rest, the beginning of the motor profile requests a new velocity from the motor. This instantaneous request for motor velocity requires a lot of energy transfer or "jerk." Jerk occurs only when a change in acceleration occurs and is defined arithmetically as the derivative of acceleration. Since linear acceleration can be viewed as a ramp, the jerk profile impulses at the beginning and end of the acceleration portions of the move. S-curve acceleration provides a means to soften the jerk. The acceleration rate is first commanded to be low and increased to a maximum rate, then decreased again until the target speed is achieved. This lessens the energy transferred into the load. Two major applications for this type of profiling are to control the shifting of material on the load (but not well fastened) and to prevent positional overshoot in high-inertia loads.

The downside to s-curve profiling is that for a given acceleration time, a higher peak acceleration is required and often requires a larger size motor (more torque) when compared to a linear acceleration profiling. Thus, an s-curve velocity profile can provide smoother motion due to increased setting times. As a result, lower throughput can result. However, since the s-curve reduces required torque at top speed, peak power requirements are reduced.

Conventionally, the user programmed a motion control system with values for initial speed, initial acceleration, maximum velocity, acceleration and deceleration. The corresponding maximum and minimum jerk values were calculated internally and employed by a motion planner through each motion profile. Once a motion profile was initiated, the user witnesses the effect the jerk values had on a system based strictly on empirical evidence. Changes to these values had to be made by estimating correct jerk parameters for each motion profile utilized.

Some motion control systems allow changes to motion parameters (e.g., velocity and acceleration limits) before the previous motion terminates. If an s-curve velocity profile is chosen, the parameter change often results in an undesired velocity profile. Such profiles are typically referred to as velocity reversals, end position overshoots, or velocity runaways. From the user's viewpoint, these behaviors are correct due to jerk rate limitations. The problem is that even experienced users will find it difficult to determine if a parameter change is safe or not. What is needed is a modification of a motion planner to (1) eliminate the above described unwanted velocity reversals, (2) maintain backward compatibility in all other cases, and (3) make its control more intuitive without interfering with the motion planner design.

BRIEF DESCRIPTION

In one aspect, a method is employed for eliminating velocity reversal in a motion profile. A start speed, a start acceleration, a speed limit, an acceleration limit, a deceleration limit, an acceleration jerk limit, and a deceleration jerk limit are programmed for the motion profile. A critical jerk value needed to avoid velocity reversal associated with the motion profile is calculated. The critical jerk value is compared to the programmed deceleration jerk limit. The larger of the critical jerk value and the programmed deceleration jerk limit is set as a computed maximum deceleration jerk limit for use with the motion profile.

In another aspect, a system prevents velocity reversal associated with a motion profile, the system includes a load. A motion controller receives at least one of a position, a velocity, an acceleration and a jerk from a user to generate a motion profile to control the motion of the load. A drive receives commands from the motion controller and generates the current required to turn the motor. A motor turns electrical energy received from the drive into mechanical energy and produces torque to move the load to a desired position. A critical jerk calculator calculates a critical jerk value necessary to avoid velocity reversal associated with the motion profile. A motion planner determines which control values to output to the drive based at least in part upon user entered parameters and/or information received from the critical jerk calculator to prevent velocity reversal with the motion profile.

In yet another aspect, a method is utilized to compute a maximum deceleration jerk value for an s-curve velocity profile to prevent velocity reversal. Values are set for a start speed, a start acceleration, a programmed deceleration jerk limit, a programmed acceleration jerk limit, a programmed deceleration limit, a programmed acceleration limit and a programmed speed limit. A product of the start speed value and the start acceleration value is calculated and a determination is made whether the product of start speed and start acceleration is greater than zero. The critical jerk value is set equal to zero if the product is greater than zero and set equal to the square of the start acceleration divided by the absolute value of the start speed and divided by two if the product is not greater than zero. The critical jerk value is compared to the programmed deceleration jerk limit. The computed maximum deceleration jerk value is set equal to the critical jerk value if the programmed deceleration jerk limit is less than the critical jerk value and equal to the programmed deceleration jerk if the programmed deceleration jerk limit is greater than the critical jerk value.

DETAILED DESCRIPTION

Undesired velocity reversal is typically caused by decreasing the deceleration jerk limit while the axis is decelerating. In an exemplary embodiment, a motion planner algorithm is modified to prevent undesired velocity reversals. This algorithm operates as follows: 1) the velocity profile is analyzed for the presence of unwanted velocity reversals, 2) if unwanted reversals are found, the deceleration jerk is increased so that the reversals are eliminated, 3) as soon as the risk of the velocity reversal is over as soon as the risk of reversal is over (e.g., when the acceleration is positive), original value of deceleration jerk is restored for the rest of the velocity profile. The above steps will use a minimal necessary deviation of the deceleration jerk to minimize the change of the velocity profile. In this manner, the modified velocity profile decelerates to zero, but does not reverse or overshoot.

Figure 1:
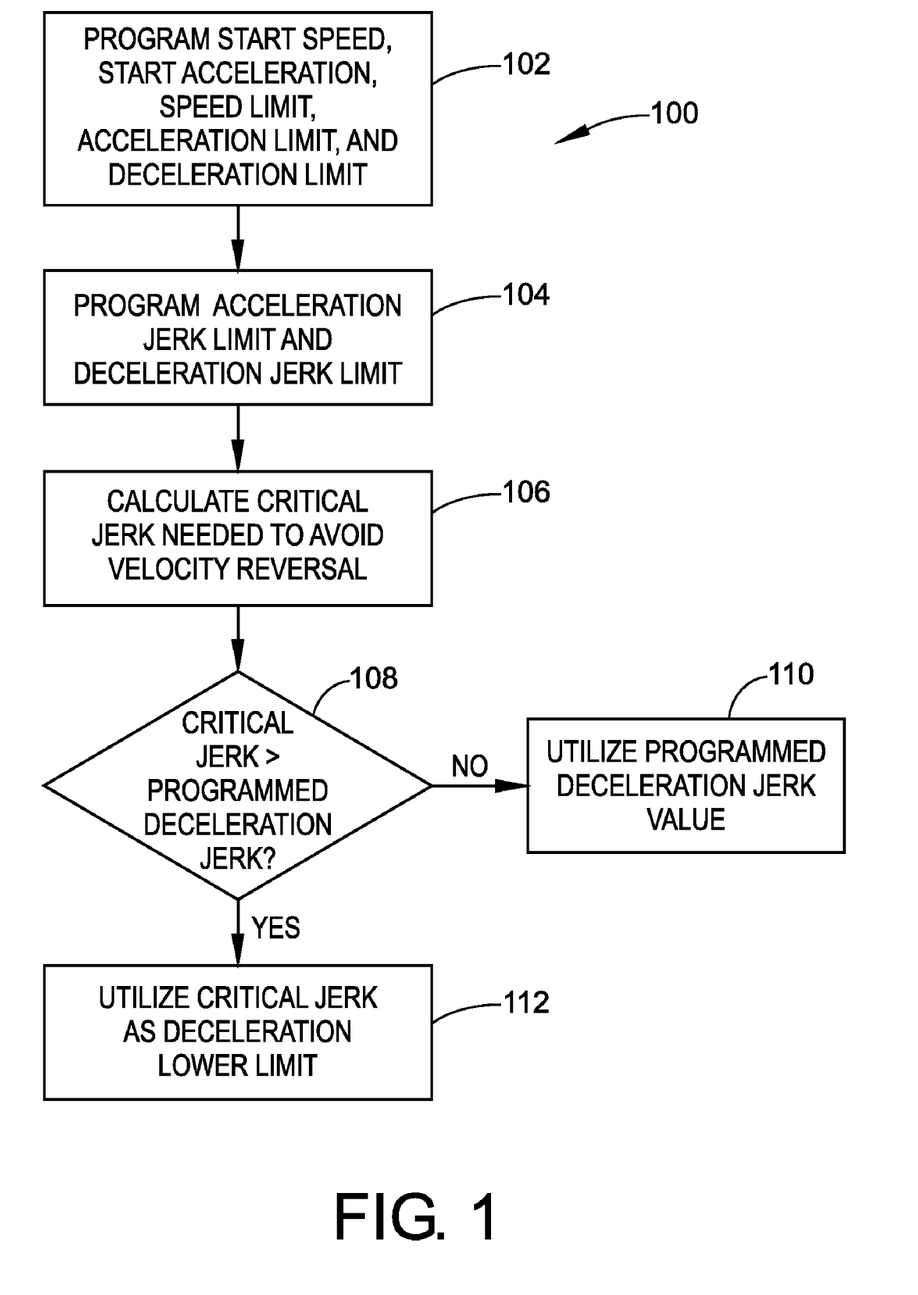
FIG. 1 is a method to eliminate undesired velocity reversal in a motion control profile, in accordance with an exemplary embodiment.

FIG. 1 illustrates a methodology in accordance with the subject invention. For simplicity of explanation, the methodologies are depicted and described as a series of acts. It is to be understood and appreciated that the subject invention is not limited by the acts illustrated and/or by the order of acts, for example acts can occur in various orders and/or concurrently, and with other acts not presented and described herein. Furthermore, not all illustrated acts may be required to implement the methodologies in accordance with the subject invention. In addition, those skilled in the art will understand and appreciate that the methodologies could be represented as a series of interrelated states via a state diagram or events.

FIG. 1 illustrates a methodology 100 to eliminate undesired velocity reversal in a motion control profile. As known, a motion control profile can include a velocity profile, an acceleration profile and a jerk profile. The methodology 100 is employed with a particular motion profile. It is to be appreciated, however, that this methodology can be implemented for any number of motion profiles. At 102, values for start speed, start acceleration, speed limit, acceleration limit, and deceleration limit are programmed. Such values can be dependent on various constraints inherent in a particular mechanical system. For example, distance from a start point to an end point of a move, motor speed, maximum motor torque output, etc. In addition, an application type can also affect the programmed value of one or more parameters. For instance, an application involving fragile materials (e.g., glass bottles, etc.) which requires smooth motion can limit the maximum speed and acceleration values employed in the motion profile.

At 104, an acceleration jerk limit and a deceleration jerk limit are programmed. Manually programming the acceleration jerk limit and the deceleration jerk limit can cause inherent problems related to the motion profile such as unintended velocity reversal, for example. In order to eliminate such velocity reversal, at 106, a critical jerk value is calculated. The critical jerk value is the minimum jerk value required to avoid velocity reversal. The critical jerk value can be calculated utilizing an algorithm: First, a determination can be made as to whether there is positive acceleration within the motion control system. If the product of start speed and start acceleration is greater than zero, then acceleration is positive. If so, the critical jerk value is equal to zero. However, if acceleration is not positive, the critical jerk value can be equal to the of the square of a start acceleration value divided by the absolute value of the value of the start speed divided by two.

At 108, the critical jerk value is compared to the deceleration jerk value programmed at 104. If the critical jerk value is not greater than the programmed deceleration jerk value, at 110, the programmed deceleration jerk value is employed. However, if the critical jerk value is greater than the programmed deceleration jerk value, at 112, the critical jerk is utilized as the lower limit value of the deceleration jerk. In many cases, this lower limit value may be employed by the motion planner to implement the motion profile. In this manner, velocity reversal within the motion profile is eliminated.

Figure 2:
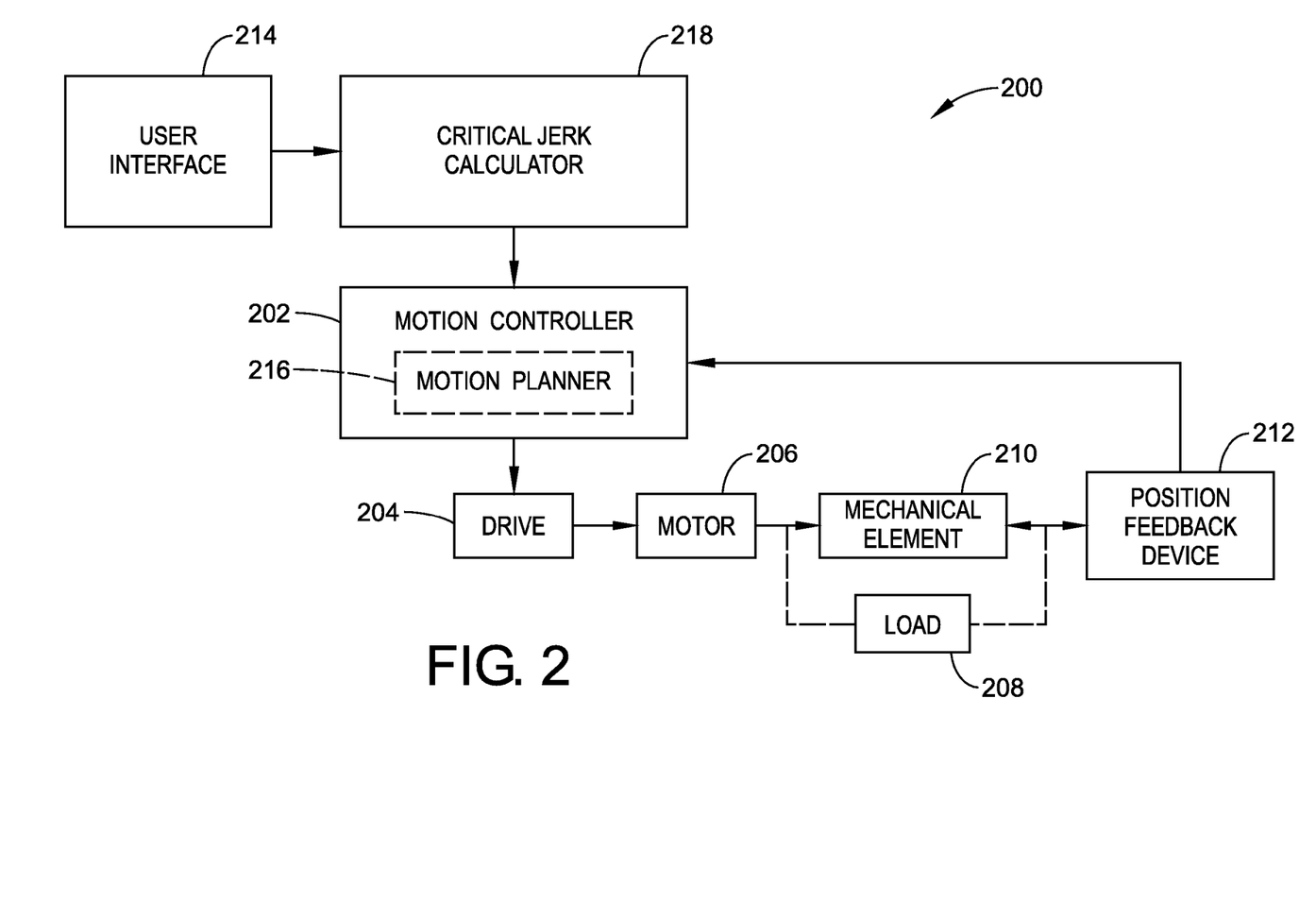
FIG. 2 is a system that that controls motion of a load, in accordance with an exemplary embodiment.

FIG. 2 illustrates a system 200 that controls motion of a load. A motion controller 202 outputs control signals to a drive 204 which is coupled to a motor 206. The motor 206 in turn is coupled to a load 208 which moves via a mechanical element 210. In one example, the load 208 is a robotic hand and the mechanical element 210 is a robotic arm. A position feedback device 212 monitors position of the load 208 and periodically communicates the position of the load to the motion controller 202. A user interface 214 allows a user to manually enter one or more parameters related to motion of the load 208. The user interface 214 can be a computer, a cell phone, a personal data assistant or a programmable logic controller, for example.

The motion controller 202 further includes a motion planner 216 which determines which control values to output to the drive 204. The motion planner receives desired motion values from the user interface via the motion controller 202. In addition, the motion planner receives information from the critical jerk calculator 218 to determine the appropriate values to output to the drive 204. In one example, the values entered via the user interface 214 can cause damage or failure of one or more components. In order to provide a fail safe mechanism, the motion planner 216 can employ values provided by the critical jerk calculator 218 (instead of the user entered values) to mitigate such expected damage or failure of one or more system 200 components. Alternatively or in addition, the motion planner 216 can utilize one or more algorithms, look up tables, etc., to select and utilize appropriate output values to provide desired motion of the load 208.

The user interface 214 can be substantially any device that allows a user to configure, edit, store, etc. one or more variables and to perform one or more processes associated therewith. In one example, the user interface utilizes a particular software package to present a plurality of options to allow a user to define and implement one or more specific motions. The user interface 214 can provide a plurality of fields related to a plurality of parameters associated with motion in a system. In one aspect, a user can designate the values for start speed, start acceleration, speed limit, acceleration limit, deceleration limit, acceleration jerk limit and deceleration jerk limit. The values for acceleration jerk limit and deceleration jerk limit can cause damage to the one or more components in the motion control system 200 if such values are outside a particular set of threshold values.

Conventionally, a user (indirectly or directly) modifies the jerk value to optimize the velocity profile. This jerk setting can be inadequate with respect to initial velocity and acceleration since a combination of high negative initial deceleration and low deceleration jerk can cause an unintentional velocity reversal in the velocity profile. As shown in FIG. 2, the motion control system 200 can be employed to mitigate such deleterious effects wherein a deceleration jerk value is calculated and utilized at least until the risk of velocity reversal is over.

The motion control system 200 can allow a user to modify acceleration jerk limit and deceleration jerk limit values. Such values are referred to herein as programmed acceleration jerk limit and programmed deceleration jerk limit. In this manner, the motion planner can control motion in a much more granular fashion that allows precise control of the position, velocity, acceleration, and jerk of a motion profile. Although allowing a user to modify such jerk values has distinct advantages over conventional motion control systems, there can be a need to compare user entered jerk values with one or more critical jerk values to mitigate deleterious effects (e.g., velocity reversal) of improper jerk within the motion control system 200. The critical jerk calculator 218 can be employed to determine critical jerk values for one or more sets of motion control parameters to avoid such deleterious effects.

In one example, an algorithm can be utilized by the critical jerk calculator 218 to determine a minimum jerk value (e.g., critical jerk) to avoid velocity reversal of the load 208. First, a determination can be made as to whether there is positive acceleration within the motion control system 200. In one approach, if the product of start speed and start acceleration is greater than zero, then acceleration is positive. If so, the critical jerk value is equal to zero. However, if acceleration is not positive, the critical jerk value can be equal to the square of a start acceleration value divided by the absolute value of the value of the start speed divided by two.

Next, a determination is made as to what value to utilize as a computed maximum deceleration jerk. Once the value of the critical jerk is calculated it can be compared to the programmed deceleration jerk limit. If the programmed deceleration jerk limit is less than the critical jerk value, the computed maximum deceleration jerk value is set equal to the critical jerk value. If the programmed deceleration jerk limit is greater than the critical jerk value, the computed maximum deceleration jerk value is set equal to the programmed deceleration jerk limit. In this manner, the critical jerk serves as a lower limit for the computed deceleration jerk value.

Finally, the computed deceleration jerk value is utilized in the motion planner 216. In one approach, the computed maximum deceleration jerk can be utilized as a deceleration jerk of an entire acceleration profile. In another approach, the computed maximum deceleration jerk can be utilized as a deceleration jerk of an initial portion of an acceleration profile. For example, the computed deceleration jerk value is utilized until a positive acceleration value is reached for the first time. This implementation is illustrated in FIG. 3.

Figure 3:
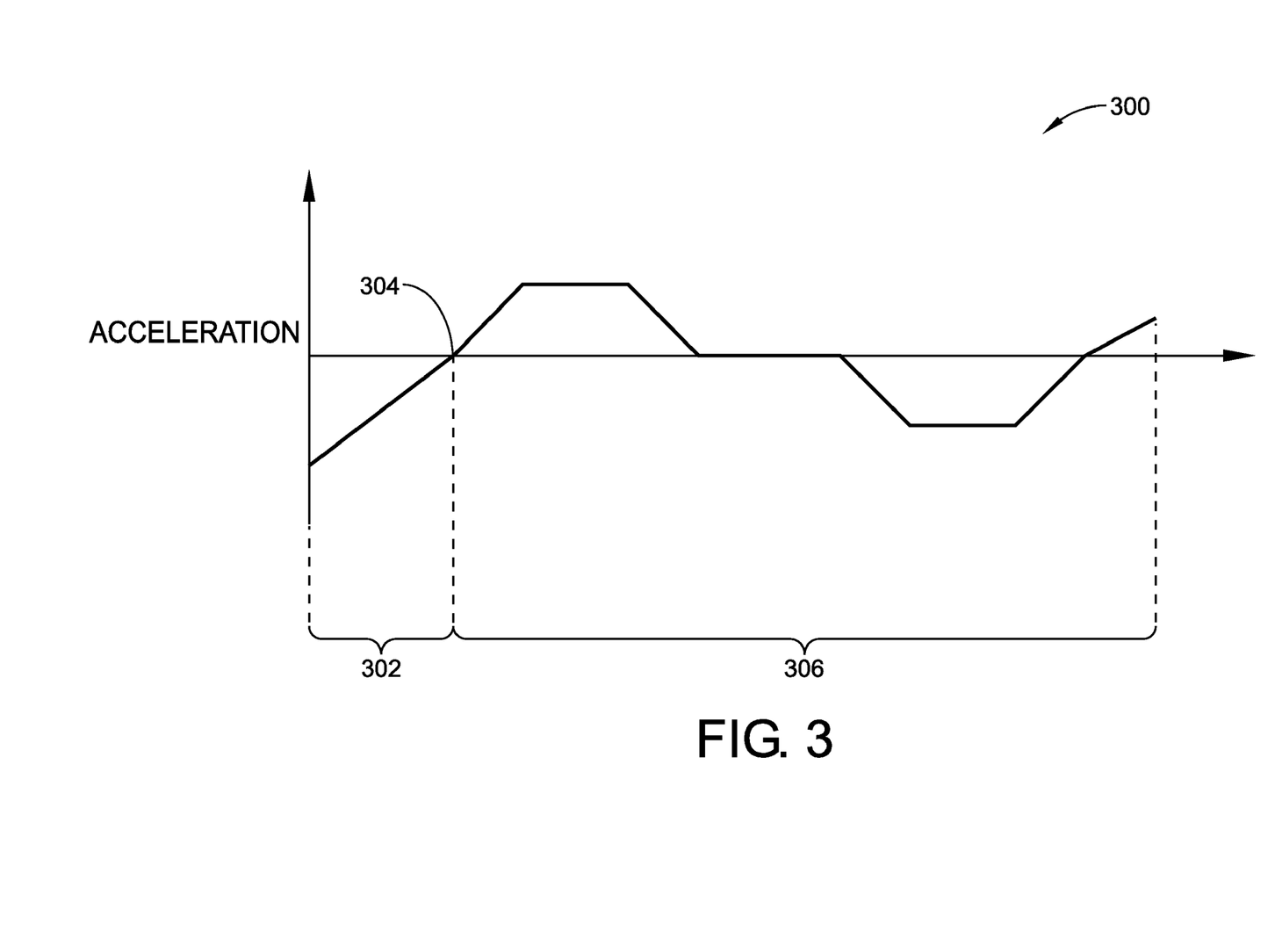
FIG. 3 is an acceleration profile versus time, corresponding to a S-curve velocity profile, in accordance with an exemplary embodiment.

FIG. 3 shows acceleration of a motion profile versus time, wherein acceleration is negative below the x-axis and positive above the x-axis. Portion 302 of the acceleration profile has a negative value until point 304 is reached where the acceleration crosses the x-axis. The remainder of the acceleration profile 306 has various values as time passes. In one aspect of this embodiment, the critical jerk value is employed until point 304. In this manner, velocity reversal associated with the motion can be avoided.

Figure 4:
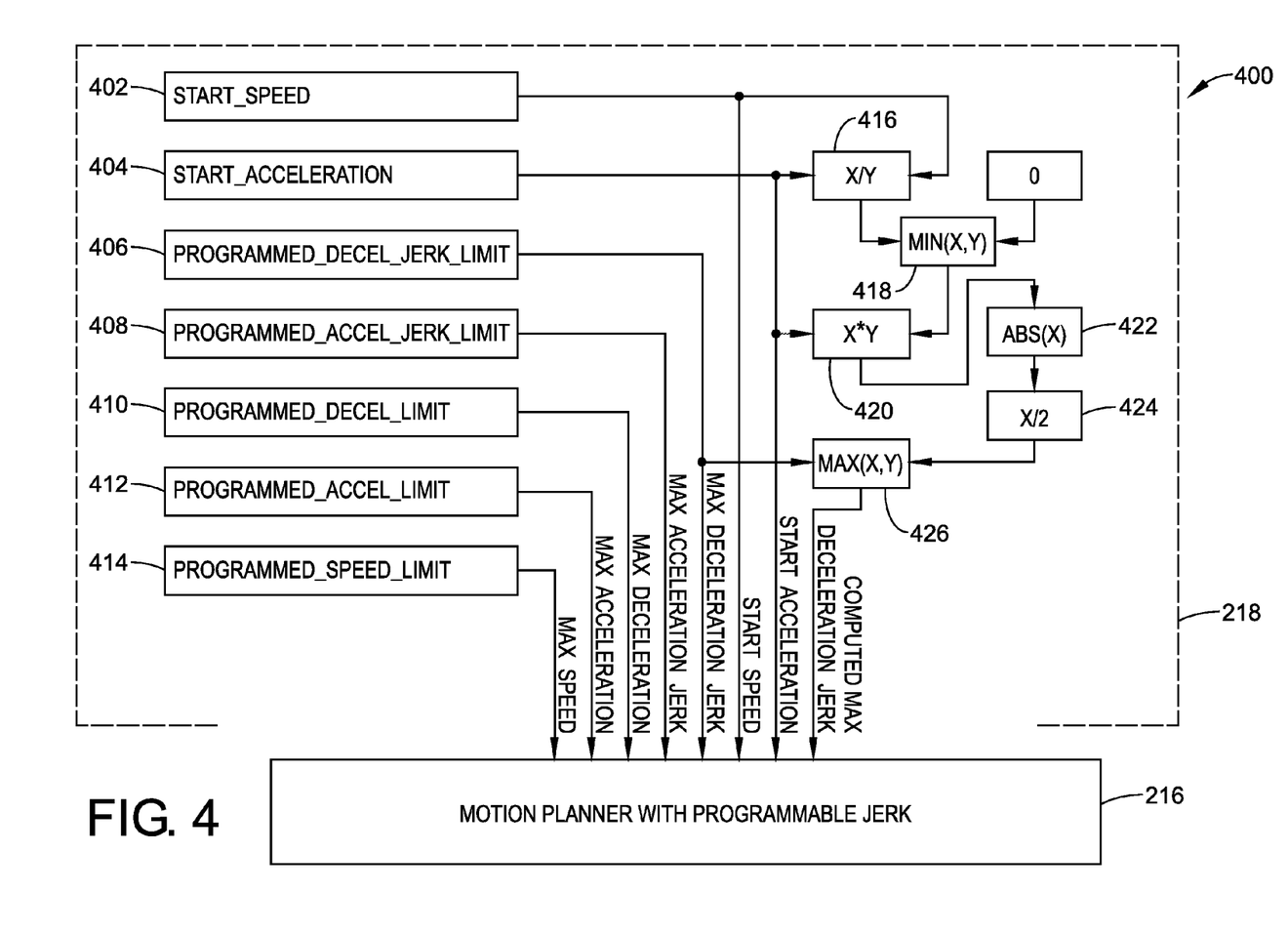
FIG. 4 is illustrates a block diagram of an algorithm to calculate one or more critical jerk values for a motion control system, in accordance with an exemplary embodiment.

FIG. 4 illustrates a block diagram 400 of an algorithm employed by the critical jerk calculator 218 to calculate one or more critical jerk values for the motion control system 200. This critical jerk value can be employed by the motion planner 216 to prevent deleterious effects to the motion control system 200. In one approach, this algorithm can be employed to determine a computed maximum deceleration jerk value employed by the motion planner 216. Initially, values are set for a start speed 402, a start acceleration 404, a programmed deceleration jerk limit 406, a programmed acceleration jerk limit 408, a programmed deceleration limit 410, a programmed acceleration limit 412 and a programmed speed limit 414. In one aspect, these values can be entered via the user interface 214.

At 416, the ratio of start speed and start acceleration is calculated. At 418, a determination is made whether the ratio of start acceleration and start speed is greater than zero, to indicate that acceleration is positive (e.g., acceleration has the same sign as velocity). If so, the critical jerk value is equal to zero. However, if the ratio of acceleration and velocity is not positive (e.g., acceleration does not have the same sign as velocity), the square of a start acceleration value divided by start velocity can be calculated at 420. At 422, the absolute value of the product calculated at 420 is determined. At 424, the critical jerk value is determined by dividing the absolute value calculated at 422 by two.

Next, a determination is made as to what value to utilize as a computed maximum deceleration jerk. Once the value of the critical jerk is calculated it can be compared to the programmed deceleration jerk limit at 426. If the programmed deceleration jerk limit is less than the critical jerk value, the computed maximum deceleration jerk value is set equal to the critical jerk value. If the programmed deceleration jerk limit is greater than the critical jerk value, the computed maximum deceleration jerk value is set equal to the programmed deceleration jerk limit. In this manner, the critical jerk serves as a lower limit for the computed deceleration jerk value. The appropriate computed maximum deceleration jerk limit is output by the critical jerk calculator 218 to the motion planner 216.

Figure 5:
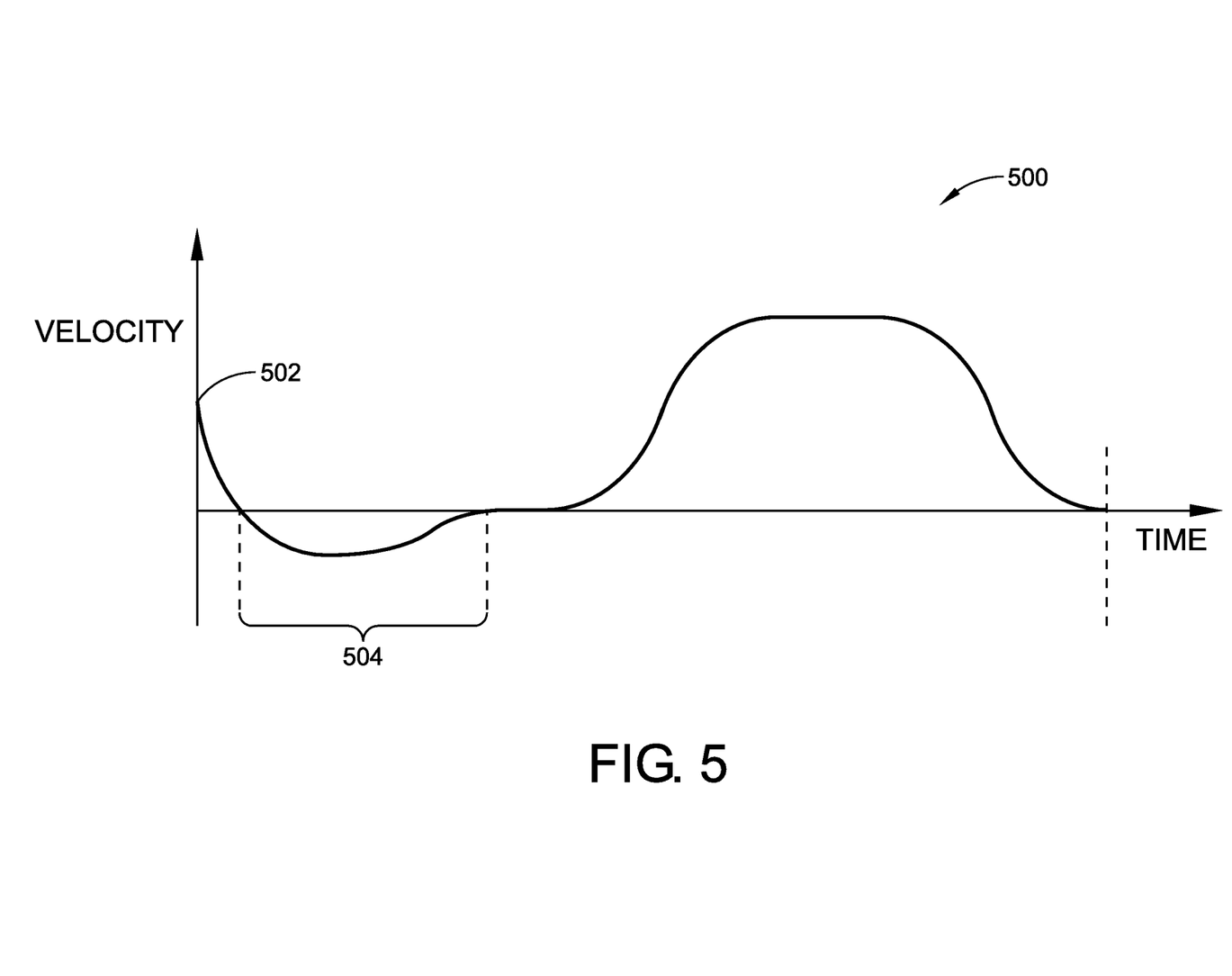
FIG. 5 is a velocity profile created by a motion planner, in accordance with an exemplary embodiment.
Figure 6:
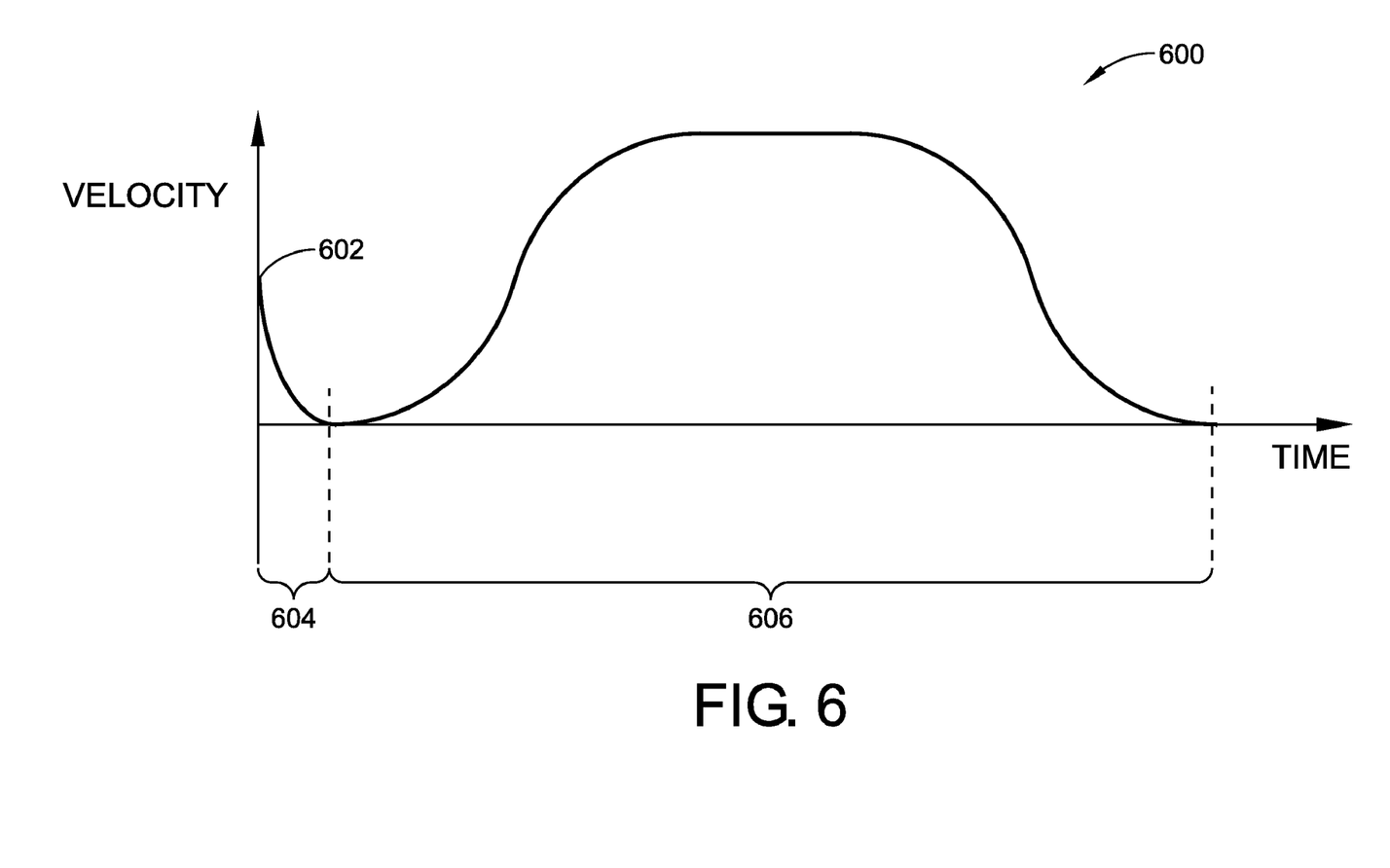
FIG. 6 is a velocity profile created by a motion planner, in accordance with an exemplary embodiment.

FIGS. 5 and 6 illustrate two velocity profiles 500 and 600 created by the motion planner 216 as a result of programmed values for start speed, start acceleration, speed limit, acceleration limit, deceleration jerk limit, and acceleration jerk limit. FIG. 5 shows the resulting velocity profile 500 when the critical jerk value received by the critical jerk calculator 218 is not employed. In this manner, the values for acceleration jerk limit and deceleration jerk limit are followed as entered by a user. Point 502 is the start speed (and start acceleration). As time progresses the velocity goes to a negative value as shown in segment 504 of the profile 500. Such negative velocity can be caused by programming incompatible values for speed, acceleration, jerk and their associated limits. In one example, this is caused by decreasing a deceleration jerk limit value while an axis is decelerating.

Profile 600 shows a corrected velocity profile created by the motion planner 216 wherein negative velocity values are eliminated. Point 602 represents the start speed (and start acceleration) for a particular motion profile. The algorithm as described above is employed to prevent velocity reversal by limiting the value of the maximum deceleration jerk such that it is not less than the critical jerk value as determined by the critical jerk calculator 218. As shown in segment 604, the critical jerk value is used in place of the programmed deceleration jerk value as long as it is greater than the programmed deceleration jerk value. This value substitution is employed until the acceleration value is zero or positive (e.g., when the risk of velocity reversal is absent). Once the acceleration value is zero or positive, as shown in segment 606, either the programmed or the computed deceleration jerk limit can be employed.

In this manner, a motion control system can safely allow a user to program acceleration and deceleration jerk limits. Such a fail safe measure is necessary to prevent damage to equipment within a motion control system. In this manner, the motion control system 200 monitors the programmed deceleration jerk limit value as compared to the critical jerk value. Such values are monitored in view of current velocity and acceleration within a current motion profile so that the critical jerk value can be implemented only when necessary. In one example, the critical jerk value is only employed until a positive acceleration is reached or subsequent to reaching a velocity value equal to zero.

The exemplary embodiment has been described with reference to the preferred embodiments. Obviously, modifications and alterations will occur to others upon reading and understanding the preceding detailed description. It is intended that the exemplary embodiment be construed as including all such modifications and alterations insofar as they come within the scope of the appended claims or the equivalents thereof.

The invention claimed is:

1. A method for eliminating undesired velocity reversal in a motion profile, comprising:
   programming a start speed, a start acceleration, a speed limit, an acceleration limit, a deceleration limit, an acceleration jerk limit, and a deceleration jerk limit for the motion profile;
   calculating a critical jerk value needed to avoid velocity reversal associated with the motion profile;
   comparing the critical jerk value to the programmed deceleration jerk limit; and
   setting the larger of the critical jerk value and the programmed deceleration jerk limit as a computed maximum deceleration jerk limit for use with the motion profile.

2. The method according to claim 1, wherein calculating the critical jerk value further includes:
   multiplying the start speed value times the start acceleration value to obtain a product;
   comparing the product to zero;
   setting the critical jerk value to zero when the product is greater than zero; and
   setting the critical jerk value to the square of the start acceleration value divided by the absolute value of the start speed value divided by two when the product is not greater than zero.

3. The method according to claim 1, wherein the motion profile is an acceleration profile.

4. The method according to claim 3, wherein the computed maximum deceleration jerk limit is utilized only until a positive acceleration value is reached for the first time.

5. The method according to claim 3, wherein the computed maximum deceleration jerk limit is utilized throughout the entire acceleration profile.

6. The method according to claim 1, further including:
   calculating the values for position, velocity, acceleration, and jerk at any point in time in the motion profile via interpolation based on the start speed, the start acceleration, the speed limit, the acceleration limit, the deceleration limit, the acceleration jerk limit, the deceleration jerk limit and the computed maximum deceleration jerk limit.

7. The method according to claim 6, wherein the critical jerk value is not set as the computed maximum deceleration jerk limit when the speed is equal to zero.

8. The method according to claim 1, wherein the programmed deceleration jerk limit is modified by a minimal incremental deviation to equal the critical jerk limit.

9. The method according to claim 1, wherein the motion profile is one of an s-curve velocity profile and an s-curve acceleration profile.

10. A system that prevents velocity reversal associated with a motion profile, comprising:
- a load;
- a motion controller that receives at least one of a position, a velocity, an acceleration and a jerk from a user to generate a motion profile to control the motion of the load;
- a drive that receives commands from the motion controller and generates the current required to turn the motor;
- a motor that turns electrical energy received from the drive into mechanical energy and produces torque to move the load to a desired position;
- a critical jerk calculator that calculates a critical jerk value necessary to avoid velocity reversal associated with the motion profile; and
- a motion planner that determines which control values to output to the drive based at least in part upon user entered parameters and/or information received from the critical jerk calculator to prevent velocity reversal with the motion profile.

11. The system according to claim 10, further including:
- a position feedback device that senses the motor position and reports the result to the controller; and
- a mechanical device that couples the motor to the load to facilitate motion of the load.

12. The system according to claim 10, further including:
- a user interface that allows a user to program a start speed, a start acceleration, a speed limit, an acceleration limit, a deceleration limit, an acceleration jerk limit, and a deceleration jerk limit for the motion profile of the load.

13. The system according to claim 12, wherein the user interface is one of a computer, a cell phone, a personal data assistant and a programmable logic controller.

14. The system according to claim 10, wherein the critical jerk calculator determines the critical jerk value by multiplying the start speed value times the start acceleration value to obtain a product, comparing the product to zero, setting the critical jerk value to zero when the product is greater than zero, and setting the critical jerk value to the square of the start acceleration value divided by the absolute value of the start speed value divided by two when the product is not greater than zero.

15. The system according to claim 10, wherein the motion profile is an s-curve velocity profile.

16. The system according to claim 10, wherein the motion profile is an s-curve acceleration profile.

17. The system according to claim 16, wherein the computed maximum deceleration jerk limit is utilized only until a positive acceleration value is reached for the first time.

18. The system according to claim 10, wherein the motion planner continuously monitors a position, a speed, an acceleration, and a jerk throughout the motion profile and does not set the critical jerk value equal to a maximum deceleration jerk limit when the speed is equal to zero.

19. The system according to claim 12, wherein the motion planner compares the critical jerk value to the programmed deceleration jerk limit and sets the larger of the critical jerk value and the programmed deceleration jerk limit as a computed maximum deceleration jerk limit for use with the motion profile.

20. A method for computing a maximum deceleration jerk value for an s-curve motion profile to prevent velocity reversal, comprising:
- setting values for a start speed, a start acceleration, a programmed deceleration jerk limit, a programmed acceleration jerk limit, a programmed deceleration limit, a programmed acceleration limit and a programmed speed limit;
- calculating a product of the start speed value and the start acceleration value;
- determining whether the product of start speed and start acceleration is greater than zero;
- setting the critical jerk value equal to zero if the product is greater than zero;
- setting the critical jerk value equal to the square of the start acceleration divided by the absolute value of the start speed and divided by two if the product is not greater than zero;
- comparing the critical jerk value to the programmed deceleration jerk limit;
- setting the computed maximum deceleration jerk value equal to the critical jerk value if the programmed deceleration jerk limit is less than the critical jerk value; and
- setting the computed maximum deceleration jerk value equal to the programmed deceleration jerk if the programmed deceleration jerk limit is greater than the critical jerk value.

* * * * *